March 3, 1970   C. L. MICHAEL   3,498,076
DRINKING WATER SUPPLY AND COOLING SYSTEM FOR AUTOMOTIVE VEHICLES
Filed Jan. 16, 1968
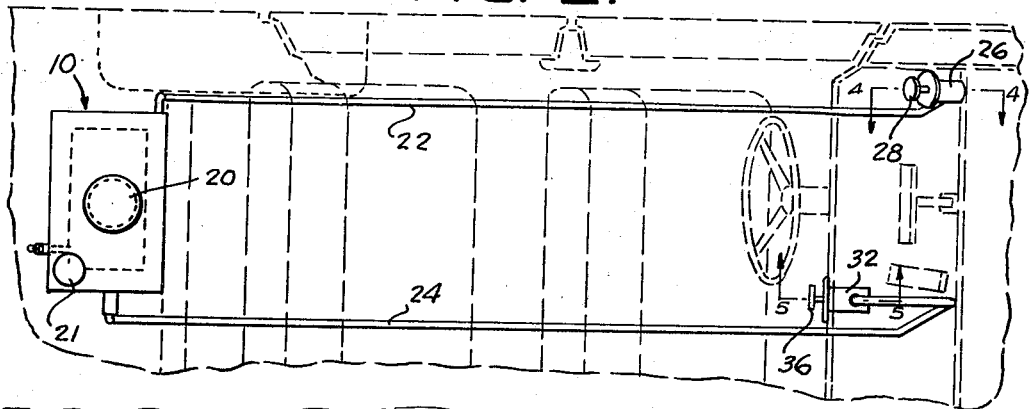
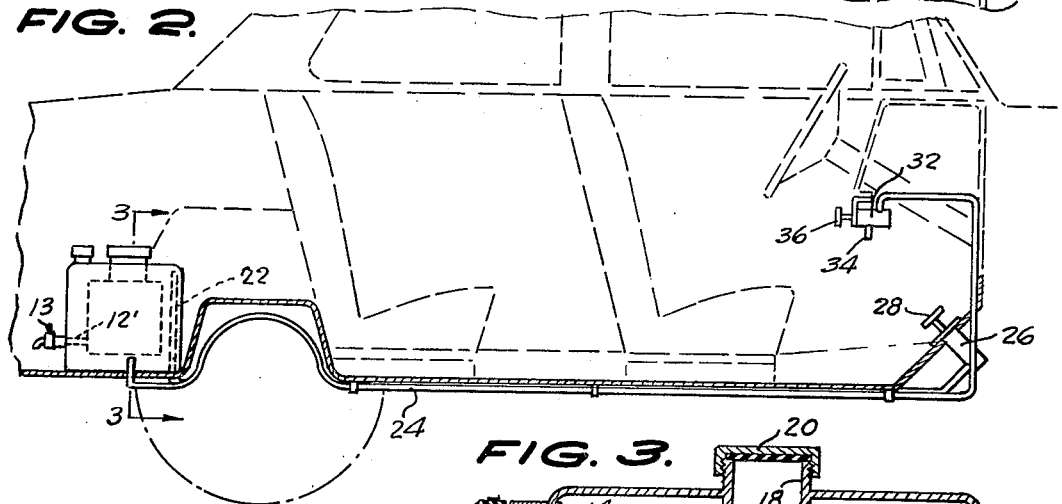
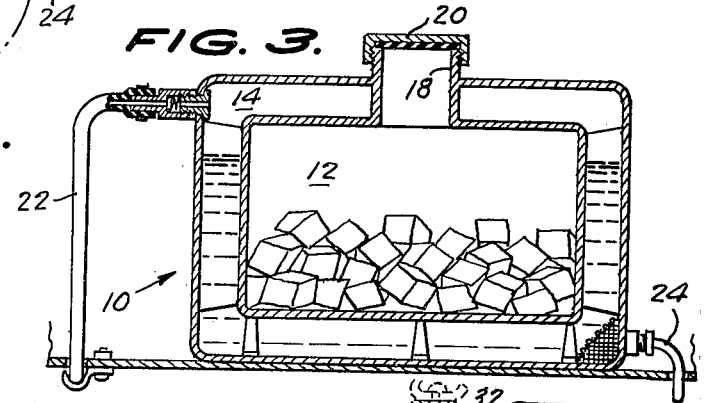
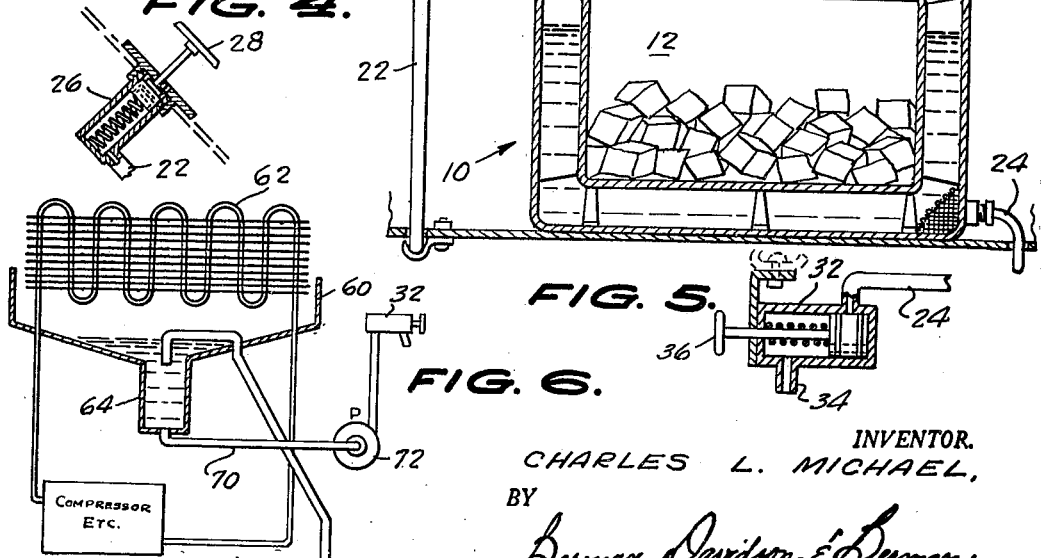
INVENTOR.
CHARLES L. MICHAEL,
BY
Berman, Davidson & Berman
ATTORNEYS.

United States Patent Office 3,498,076
Patented Mar. 3, 1970

3,498,076
DRINKING WATER SUPPLY AND COOLING SYSTEM FOR AUTOMOTIVE VEHICLES
Charles L. Michael, Rte. 1, Box 29A,
Prince Frederick, Md. 20678
Filed Jan. 16, 1968, Ser. No. 698,204
Int. Cl. B60h 3/04; F25d 21/14; B67d 5/62
U.S. Cl. 62—244                                    4 Claims

ABSTRACT OF THE DISCLOSURE

A drinking water supply and cooling system comprising an insulated tank to be secured to a portion of an automotive vehicle; an air line connected to said tank adjacent to its top and a pump for supplying air pressure to said line, said pump being mounted adjacent the driver's seat; a water line entering said tank adjacent the bottom thereof, said line being connected to a spigot mounted adjacent a passenger seat in said vehicle.

---

A system as aforesaid including means to collect condensate from the expansion coils of an automotive air conditioning apparatus and to deliver said condensate to said spigot.

It is an object of the present invention to increase the comfort and convenience of family travel in a conventional automotive vehicle, particularly when the traveling family includes several small children.

It is a further object of this invention to provide a source of cold fresh water conveniently available to the seating arrangement of an automotive vehicle and which source can be pressurized at the will of the driver for delivery of the water to a convenient outlet.

It is a further object of this invention to provide a source of water which will be automatically replenished and automatically cooled.

The above and other objects will be made clear from the following detailed description taken in connection with the annexed drawing, in which:

FIGURE 1 is a schematic top plan view partly in section showing the simplest form of tank, pump and water delivery system;

FIGURE 2 is a side elevation corresponding to FIGURE 1;

FIGURE 3 is a section on the line 3—3 of FIGURE 2;

FIGURE 4 is a sectional detail of the pump;

FIGURE 5 is a detailed section of a preferred form of spigot; and

FIGURE 6 is a schematic view showing the application of the system to an air conditioning unit.

Referring now to FIGURES 1, 2 and 3, a water storage tank is generally indicated at 10 and preferably consists of an inner shell 12 and an outer shell 14. The shells preferably are of rectangular form as shown and are separated by at least two inches of space. The object here is to provide separate compartments for the drinking water (the space between shells 12 and 14) and the ice or other coolant which is placed in the shell 12. Preferably, the outer shell 14 is surrounded by a third shell (not shown) and the space between the outside of the shell 14 and the third shell is filled with foamed polystyrene, polyurethane or polyethylene. While from a manufacturing and cost standpoint foamed in place plastic is preferred, the insulating material could comprise balsa shavings, kapok or any of the more conventional insulating materials.

As seen in FIGURES 1 and 2, the top of the shell 12 is provided with a wide-mouthed opening 18 closed by an insulated cap 20. The wide mouth is preferred since it facilitates placing of ice cubes into the shell 12. The cap 20 preferably has screw-threaded connection with the inlet opening 18 and is gasketed to provide a hermetic seal when properly closed.

The rectangular configuration of the tank is preferred since such a form lends itself better to the exigencies of the basic accommodation in the average automotive vehicle. Other and more specialized configurations, however, are not by this expression of preference excluded from the scope of this invention.

As seen in FIGURES 1 and 3, an air line 22 is connected at one upper corner of the shell 14 while a water line 24 is connected to the diagonally opposite lower corner of the shell. This arrangement permits a tank to be rotated 90 degrees from the position of FIGURE 3 without, however, placing the air line below or level with the water line. Depending on the general proportions and configuration of the shell, this is a valuable feature when it comes to installing the tank in any particular automotive vehicle. The air line 22 terminates in an air pump 26 operated by a foot pedal 28 and preferably located on the floor boards adjacent the conventional "dimmer" switch for maximum convenience of the driver who thus can use his left foot to pump up air pressure in the shell 12. The pump 26 is largely conventional and is not disclosed in detail here except in FIGURE 4.

The water line 24 terminates in a spring-closed faucet 32 having a water outlet 34 and an operating handle 36. The handle 36 is spring-biased to closed position (FIGURE 5) and is opened by pulling the handle outwardly from the plane of the dashboard. This again is a matter of preference. Applicant believes that a child who inadvertently operates the valve is more apt to let go of it promptly if he is pulling than would be the case if he were pushing. Here too the mechanics of the valve are conventional and not disclosed in detail.

The tank 10 is supported on floor boards 40 forming part of the trunk or of the rear seating arrangement of the vehicle. The tank is detachably secured in position by conventional straps connecting to bolts in the floor by any of a variety of self-tensioning, quickly attachable and detachable means, all of which are conventional and therefore not shown. An example, however, is the familiar trunk latch.

Once the tank 14 has been loaded with, say, a gallon of water through cap 21 and the tank 12 with substantially an equal volume of ice cubes, the caps 20 and 21 are sealed in place and when any passenger desires a drink of water, the driver simply steps a few times on the treadle 36 to put the system under air pressure of two to four p.s.i. which is ample to deliver water to the faucet. Both tubes 22 and 24 perferably are of extruded polyethylene formation of about ¼-inch I.D.

A drainage tube 12' (FIGURES 1 and 2) runs from tank 12 through tank 14 and its insulation and terminates in a conventional spigot 13. This permits draining the water occasioned by melted ice in tank 12. The water thus supplied can be placed at once in tank 14. There is thus provided an emergency supply of cool water, should this be required at a time and place where the same is not available at roadside.

In almost all cases it will be preferred to locate the tank in the conventional trunk of the conventional automotive vehicle with the tubes 22 and 24 penetrating the floor board and being suitably secured to the underpinnings of the car, then penetrating the floor boards at the front seat with tube 22 going to the pump and tube 24 being secured with its faucet 32 on or adjacent to the dashboard. Naturally, the lay-outs of ashtrays, radio and instrumentation on the dashboard will dictate the precise location of the spigot or faucet 32. It will be clear enough that the installation of the system in an existing car will require a minimum of time and skill. The drilling incident to installing the bottom plate 42, the pump 28 and the valve 32 all can be done with a car at ground level. The attachment of bolts to the floor boards and the stretching of tubes 22 and 24 from the tank to the front seat can be accomplished easily, either with the car over a pit or elevated on a conventional elevator.

Referring now to FIGURE 6, there is shown a conventional compartment 60 containing the conventional expansion coils 62 of a conventional automotive air conditioning unit. A conventional blower, not shown, forces air over the coil 62 and delivers the cooled air to the interior of the car. On any day on which air conditioning is desired in the vehicle there will automatically be a considerable accumulation of condensate on the coil 62 and ordinarily such condensate is simply permitted to drain out of the car to the roadway. Naturally, if the condensate is to be used as drinking water, some form of air cleaner or filter should pass the air going to the expansion coils.

The present invention contemplates providing a sump 64 adjacent the coil 62 to collect condensate with an automatic overflow connection 66 which will drain to the roadway in accordance with current practice.

In this case, an auxiliary expansion coil may be placed in parallel with the coil 62 and be inserted in the tank 14 so that whenever the air conditioner is operating there will be refrigeration in the tank 14, making ice cubes unnecessary. A line 70 leads from the sump 64 to a pump 72 which in turn may deliver condensate to the tank 14. The pump is driven by a small motor, not shown, which may be turned on and off by a float valve of conventional form in the tank 14 so that when water in the tank 14 reaches a certain minimum level, condensate in the sump 64, if available, will be fed from the sump 64 into the tank 14. In such case, the motor circuits of the pump 72 should be equipped with a timer which will shut off the pump motor after running for a predetermined interval, thus avoiding any possibility of over-pressurizing or overfilling the tank 10.

In FIGURE 6, however, the pump 72 connects directly to the faucet 32 which in such case includes a switch for starting the motor of pump 72 whenever faucet 32 is opened and stopping it when closed.

While certain specific details have been illustrated and described herein, it is not intended that this invention be limited to the precise details disclosed but only as set forth in the subjoined claims.

What is claimed is:

1. A drinking water supply and cooling system for automotive vehicles having an air conditioning unit located outside the passenger compartment of the vehicle, said unit having condensing and evaporating means, said system comprising: means to collect condensate from the evaporating means of the air conditioning unit; a faucet mounted for access by the passengers of the vehicle; and means to deliver collected condensate to said faucet in response to opening of said faucet.

2. A system as set forth in claim 1, including means responsive to opening said faucet for actuating said delivery means.

3. The system of claim 1, in which the condensate delivery means comprises a pump.

4. The system of claim 2, in which the condensate delivery means comprises a pump.

References Cited

UNITED STATES PATENTS

| | | | |
|---|---|---|---|
| 3,148,675 | 9/1964 | Menuto | 165—46 X |
| 2,196,310 | 4/1940 | Kalin | 62—245 |
| 2,761,292 | 9/1956 | Coanda et al. | 62—291 |
| 3,210,956 | 10/1965 | Maier et al. | 62—291 |
| 3,333,438 | 8/1967 | Benua et al. | 62—389 |
| 1,826,471 | 10/1931 | James | 62—244 X |
| 2,430,335 | 11/1947 | Hart | 62—244 X |
| 2,557,004 | 6/1951 | Lepper | 62—244 X |
| 3,352,353 | 11/1967 | Stevens et al. | 62—244 X |
| 3,355,908 | 12/1967 | Anglin | 62—244 |

LLOYD L. KING, Primary Examiner

U.S. Cl. X.R.

62—291, 389